US007998361B2

(12) United States Patent
Hirose et al.

(10) Patent No.: US 7,998,361 B2
(45) Date of Patent: Aug. 16, 2011

(54) SOFT MAGNETIC MATERIAL AND POWDER MAGNETIC CORE

(75) Inventors: Kazuhiro Hirose, Itami (JP); Haruhisa Toyoda, Itami (JP); Takao Nishioka, Itami (JP); Naoto Igarashi, Itami (JP); Toru Maeda, Itami (JP); Yoshiyuki Shimada, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 429 days.

(21) Appl. No.: 10/599,003

(22) PCT Filed: Mar. 29, 2005

(86) PCT No.: PCT/JP2005/005887

§ 371 (c)(1), (2), (4) Date: Sep. 18, 2006

(87) PCT Pub. No.: WO2005/096324

PCT Pub. Date: Oct. 13, 2005

(65) Prior Publication Data

US 2007/0194267 A1 Aug. 23, 2007

(30) Foreign Application Priority Data

Mar. 31, 2004 (JP) ................................ 2004-103686
Mar. 31, 2004 (JP) ................................ 2004-103687

(51) Int. Cl.

| | |
|---|---|
| ***C04B 35/00*** | (2006.01) |
| ***C09D 5/23*** | (2006.01) |
| ***H01F 1/00*** | (2006.01) |
| *C01G 49/08* | (2006.01) |
| *C04B 35/26* | (2006.01) |
| *C04B 35/64* | (2006.01) |

(52) U.S. Cl. ............................ 252/62.51 R; 252/62.56

(58) Field of Classification Search ............... 252/62.56, 252/62.51 R

See application file for complete search history.

(56) References Cited

U.S. PATENT DOCUMENTS

| | | | | |
|---|---|---|---|---|
| 4,177,089 | A * | 12/1979 | Bankson | 148/309 |
| 5,198,137 | A * | 3/1993 | Rutz et al. | 252/62.54 |
| 5,277,831 | A * | 1/1994 | Hanano | 508/155 |
| 5,306,524 | A * | 4/1994 | Rutz et al. | 427/216 |
| 6,162,836 | A * | 12/2000 | Kato | 516/77 |
| 6,280,683 | B1 | 8/2001 | Hendrickson et al. | |
| 6,348,265 | B1 * | 2/2002 | Jansson et al. | 428/403 |
| 6,372,348 | B1 * | 4/2002 | Hanejko et al. | 428/407 |
| 6,706,206 | B1 | 3/2004 | Aichele et al. | |
| 2003/0047706 | A1 | 3/2003 | Mitani et al. | |
| 2004/0191519 | A1 * | 9/2004 | Kejzelman et al. | 428/407 |
| 2005/0205848 | A1 * | 9/2005 | Kamiya et al. | 252/500 |

FOREIGN PATENT DOCUMENTS

| | | | |
|---|---|---|---|
| JP | 06-084676 | A | 3/1994 |
| JP | 6-507928 | A | 9/1994 |
| JP | 07-245209 | A | 9/1995 |
| JP | 07-254522 | A | 10/1995 |
| JP | 08-037107 | A | 2/1996 |
| JP | 08-100203 | A | 4/1996 |
| JP | 09-104902 | A | 4/1997 |
| JP | 2000-003810 | A | 1/2000 |
| JP | 2000-030924 | A | 1/2000 |
| JP | 2001-358005 | A | 12/2001 |
| JP | 2002-217015 | A | 8/2002 |
| JP | 2003-510460 | A | 3/2003 |
| JP | 2003-526693 | A | 9/2003 |
| JP | 2005-133148 | A | 5/2005 |
| WO | WO-92/20522 | A1 | 11/1992 |

OTHER PUBLICATIONS

Zhao. Structure and magnetic properties of the oxide layers on iron ultrafine particles. Applied Physics A 4. pp. 483-486 (1997).*

* cited by examiner

*Primary Examiner* — Carol M Koslow
*Assistant Examiner* — Matthew Hoban
(74) *Attorney, Agent, or Firm* — Venable LLP; Michael A. Sartori; Michael E. Nelson

(57) ABSTRACT

A soft magnetic material includes: a plurality of composite magnetic particles formed from a metal magnetic particle and an insulative coating surrounding a surface of the metal magnetic particle and containing metallic salt phosphate and/or oxide; and a lubricant formed as fine particles added at a proportion of at least 0.001 percent by mass and no more than 0.1 percent by mass relative to the plurality of composite magnetic particles. With this structure, superior lubrication is provided during compacting and desired magnetic characteristics can be obtained after compacting.

4 Claims, 9 Drawing Sheets

SOFT MAGNETIC MATERIAL AND POWDER MAGNETIC CORE

CROSS-REFERENCE TO PRIOR APPLICATIONS

This application is a U.S. national phase application under 35 U.S.C. §371 of International Patent Application No. PCT/JP2005/005887, filed Mar. 29, 2005, and claims the benefit of Japanese Application No. 2004-103686, filed Mar. 31, 2004, and Japanese Application No. 2004-103687, filed Mar. 31, 2004, all of which are incorporated by reference herein. The International Application was published in Japanese on Oct. 13, 2005 as International Publication No. WO 2005/096324 A1 under PCT Article 21(2).

TECHNICAL FIELD

The present invention relates generally to a soft magnetic material and powder magnetic core. More specifically, the present invention relates to a soft magnetic material and powder magnetic core equipped with a plurality of metal magnetic particles covered with insulative coating.

BACKGROUND ART

A first background technology will be described. In products such as electromagnetic valves and motors, there has been a trend toward replacing electromagnetic steel plates with powder magnetic cores having superior magnetic characteristics over a wide frequency range. An example of a method for making this type of powder magnetic core is described in Japanese Laid-Open Patent Publication Number Hei 8-100203 (Patent Document 1), in which unsintered compact is made to form a metal composite part using powder metallurgy.

According to the method described in Patent Document 1, a slip additive is applied to the wall surfaces of a die electrostatically in the form of an aerosol of solid particles or liquid droplets. It would be preferable for the liquid droplets or solid particles to have a particle diameter of no more than 100 microns, more preferably no more than 50 microns, and even more preferably no more than 15 microns. Next, the die is filled with a metal powder composition, and this is compressed to form the unsintered compact. An unsintered compact with an especially high density is obtained when the compact made in this manner contains internal lubricant at a proportion of 0.1 percent by weight to 0.4 percent by weight, preferably 0.2 percent by weight to 0.3 percent by weight.

Also, Japanese Laid-Open Patent Publication Number Hei 9-104902 describes a powder compacting method that seeks to improve the material properties of a compact and the workability of the compact (Patent Document 2). In the powder compacting method described in Patent Document 2, a solid lubricant formed from a fatty acid or a metallic soap is sprayed onto a powder or the inner walls of a die before the die is filled with the powder. It would be preferable for the amount of sprayed solid lubricant to be 0.001 percent by weight to 2 percent by weight. For example, stearic acid could be sprayed onto the inner walls of a die at a proportion of 0.1 percent by weight.

A second background technology will be described. In electrical parts such as motor cores and transformer cores, there has been a demand for higher densities and more compact designs while allowing accurate control with low power. As a result, there has been active development of powder magnetic cores used to make these electrical parts that have superior magnetic characteristics especially in medium- and high-range frequencies. An example of a method for making this type of powder magnetic core is to add an organic lubricant to iron powder that has been surface treated to form a phosphate coating. The obtained mixed powder is compacted to form a compact. To remove distortions generated during the compacting, heat treatment is applied to the compact.

Also, Japanese Translation of PCT International Application Hei 6-507928 describes a magnetic powder composition used for magnetic parts and a method for making the same (Patent Document 3). The magnetic powder composition described in Patent Document 3 contains: iron powder coated with a thermoplastic resin; and a boron nitride powder mixed preferably at a proportion of 0.05 percent to 0.4 percent relative to the weight of the coated iron powder.

In the first background technology described above, Patent Document 1 and Patent Document 2 use a predetermined lubricant or solid lubricant to reduce friction during compacting. If a large amount of this lubricant is used, however, a non-magnetic layer takes up a high proportion of the powder magnetic core obtained by compacting, reducing the magnetic characteristics of the powder magnetic core. If a small amount of lubricant is used, lubrication during compacting is inadequate, causing the metal powders to rub against each other. Since this introduces significant distortion within the metal powders, the magnetic characteristics of the obtained powder magnetic core may be reduced. Also, if lubrication is inadequate during compacting, the die may not be filled with the metal powder in a uniform manner, or the density of the powder may be inadequate. This can lead to uneven or reduced density in the powder magnetic core.

Also, in the second background technology described above, a large amount of organic lubricant can be added to the iron powder coated with phosphate to prevent friction during compacting from destroying the phosphate coating. However, this increases the proportion of the organic lubricant in the powder magnetic core too much, leading to increased hysteresis loss in the obtained powder magnetic core. On the other hand, adding a very small amount of organic lubricant can limit the increase in hysteresis loss, but the phosphate coating will be destroyed during compacting, leading to increased eddy current loss in the powder magnetic core.

Also, since the organic lubricant has a relatively low thermal decomposition temperature, using a high temperature to treat the compact can lead to thermal decomposition of the organic lubricant and dispersion of the lubricant into the iron powder. This can lead to reduced magnetic characteristics for the obtained powder magnetic core. Furthermore, carbon (C) in the organic lubricant is left behind in the powder magnetic core as residue. Since carbon has a very low electrical resistance, it can lead to continuity between iron powders, thus increasing eddy current loss between particles in the powder magnetic core.

Also, if the powder magnetic core is used at a high temperature, the organic lubricant contained in the powder magnetic core may soften or melt. This will significantly reduce the strength of the powder magnetic core.

Also, the magnetic powder composition in Patent Document 3 contains boron nitride powder instead of an organic lubricant. However, since the proportion of boron nitride powder in Patent Document 3 is too high, the proportion of the magnetic body is small. This leads to reduced magnetic flux density of the magnetic powder composition and to increased iron loss from increased hysteresis loss.

SUMMARY OF THE INVENTION

The object of the present invention is to overcome the problems described above and to provide a soft magnetic material that can provide desired magnetic characteristics after compacting and a powder magnetic core made from this soft magnetic material. Another object of the present invention is to provide a powder magnetic core, a soft magnetic material, and method for making a powder magnetic core having desired magnetic characteristics.

Means to Solve the Problem

According to one aspect of the present invention, a soft magnetic material is used to make a powder magnetic core. A soft magnetic material used to make powder magnetic cores includes: a plurality of composite magnetic particles formed from a metal magnetic particle and an insulative coating surrounding a surface of the metal magnetic particle and containing metallic salt phosphate and/or oxide; and a lubricant formed as fine particles added at a proportion of at least 0.001 percent by mass and no more than 0.1 percent by mass relative to the plurality of composite magnetic particles.

In this soft magnetic material, the proportion of the lubricant formed as fine particles is at least 0.001 percent by mass, making it possible to obtain adequate lubrication between composite magnetic particles during compacting when making a powder magnetic core. Also, by having the proportion of the lubricant formed as fine particles be no more than 0.1 percent by mass, the distance between the metal magnetic particles does not become too big. This makes it possible to prevent the creation of demagnetizing fields between the metal magnetic particles (created because the formation of magnetic poles in the metal magnetic particles leads to energy loss), and increased hysteresis loss resulting from demagnetizing fields can be limited. Also, by limiting the volume proportion of the non-magnetic layer in the powder magnetic core, it is possible to prevent saturation magnetic flux density from decreasing.

In addition, the insulative coating containing metallic salt phosphate and/or oxide provides superior lubrication. As a result, even if insulating coating rubs against each other during compacting, significant friction is not generated.

Thus, in the present invention, the advantages provided by the lubricant formed as fine particles and the advantages provided by the insulative coating work together to significantly improve lubrication during compacting. As a result, destruction of the insulative coating during compacting can be prevented and the introduction of significant distortion in the metal magnetic particles can be prevented. This makes it possible to obtain a powder magnetic core with low eddy current loss and hysteresis loss and with desired magnetic characteristics.

It is preferable for the lubricant formed as fine particles to have a mean particle diameter of no more than 2.0 microns. With this soft magnetic material, the lubricant formed as fine particles is interposed with a higher probability between the composite magnetic particles during the compacting operation performed to make the powder magnetic core. As a result, even using a very small amount of no more than 0.1 percent by mass, the lubricant formed from fine particles can function as a reliable additive that provides lubrication between the composite magnetic particles.

It is preferable for the lubricant to be formed as fine particles includes a metallic soap and/or an inorganic lubricant with a hexagonal crystal structure. An inorganic lubricant is a lubricant that has as its main component a material that does not contain carbon (C) or an allotrope of carbon, including graphite, which is an allotrope of carbon.

With this soft magnetic material, if the lubricant formed as fine particles contains metallic soap, the metallic soap provides superior lubrication so that friction between composite magnetic particles during compacting is reduced in an effective manner. If the lubricant formed as fine particles contains an inorganic lubricant having a hexagonal crystal structure, the inorganic lubricant is formed with a layered structure. The cleavage that takes place in the layered structure of the inorganic lubricant provides superior lubrication even though a very low proportion of no more than 0.1 percent by mass is used. More specifically, when compacting is being performed to make the powder magnetic core, the presence of the inorganic lubricant between the composite magnetic particles causes the outermost surface of the crystal layers of the inorganic lubricant that is contact with the composite magnetic particles to peel off, significantly reducing friction between particles. As a result, strong friction between the composite magnetic particles during compacting is prevented, and the introduction of significant distortion in the particles is restricted. Also, compared to organic lubricants, inorganic lubricants generally have high thermal decomposition temperatures and provide superior heat resistance. Thus, when making the powder magnetic core, heating at high temperatures does not result in the degrading or softening of the inorganic lubricant.

It is preferable for a proportion of the lubricant formed as fine particles relative to the plurality of composite magnetic particles to be at least 0.001 percent by mass and no more than 0.025 percent by mass. With this soft magnetic material, the creation of demagnetizing fields between the metal magnetic particles is further limited, while the proportion of the powder magnetic core taken up by the non-magnetic layer can be further reduced.

It is preferable to further include a thermoplastic resin interposed between the plurality of composite magnetic particles at a proportion of at least 0.001 percent by mass and no more than 0.1 percent by mass relative to the plurality of composite magnetic particles. With this soft magnetic material, the inclusion of thermoplastic resin in addition to the lubricant formed as fine particles makes it possible to firmly bind adjacent composite magnetic particles. The adhesive effect of the thermoplastic resin improves the strength of the powder magnetic core. Also, when the compact is processed to make the powder magnetic core, the adhesive effect prevents composite magnetic particles from peeling off of surfaces being processed due to processing stress. As a result, processed surfaces have low surface roughness and good machinability. Also, the addition of thermoplastic resin improves insulation between composite magnetic particles. As a result, creation of eddy currents between particles and iron loss in the powder magnetic core are further reduced.

These advantages are adequately provided with a proportion of thermoplastic resin of at least 0.001 percent by mass. Also, by using a proportion of thermoplastic resin that is no more than 0.1 percent by mass, the proportion that the non-magnetic layer takes up in the powder magnetic core is prevented from being too high. This prevents reduction in the magnetic flux density of the powder magnetic core.

A powder magnetic core according to another aspect of the present invention is a powder magnetic core made using a soft magnetic material including a plurality of composite magnetic particles (30) formed from a metal magnetic particle (10) and an insulative coating (20) surrounding a surface of said metal magnetic particle (10) and containing metallic salt phosphate and/or oxide as well as a lubricant formed as fine particles added at a proportion of at least 0.001 percent by mass and no more than 0.1 percent by mass relative to said plurality of composite magnetic particles (30). With this powder magnetic core, the reduced eddy current loss and the reduced hysteresis loss makes it possible to achieve magnetic characteristics with low iron loss. When a powder magnetic core is made, other organic matter may be added to improve strength and heat resistance. The advantages of the present invention are provided even with the presence of these organic materials.

It is preferable for the powder magnetic core to have a fill ratio of at least 95 percent. When any of the soft magnetic materials described above are used with this type of powder magnetic core, it is possible to limit the amount of lubricant added while achieving superior lubrication, thus making it possible to make a powder magnetic core with an improved fill ratio. This improves the strength of the powder magnetic core, providing magnetic characteristics with a high magnetic flux density.

According to another aspect, the present invention provides a soft magnetic material used to make powder magnetic cores. This soft magnetic material includes a plurality of composite magnetic particles formed from a metal magnetic particle and an insulative coating surrounding the surface of the metal magnetic particle and containing a metallic salt phosphate and/or oxide as well as a lubricating powder containing a metallic soap and added to the plurality of composite magnetic particles at a proportion of at least 0.001 percent by mass and no more than 0.1 percent by mass. The mean particle diameter of the lubricating powder is no more than 2.0 microns.

With this soft magnetic material, the mean particle diameter of the lubricating powder is set to be no more than 2.0 microns so that when compacting is performed to make the powder magnetic core, there is a higher probability that lubricating particles will be interposed between the composite magnetic particles. As a result, even with a very small amount of no more than 0.1 percent by mass, the lubricating powder functions reliably as a lubricant between the composite magnetic particles. By setting the proportion of the lubricating powder to be at least 0.001 percent by mass, it is possible to provide this advantage adequately. Also, by setting the proportion of the lubricating powder to be no more than 0.1 percent by mass, the distance between the metallic magnetic particles is prevented from becoming too large. This makes it possible to prevent the creation of demagnetizing fields between the metal magnetic particles (created because the formation of magnetic poles in the metal magnetic particles leads to energy loss), and increased hysteresis loss resulting from demagnetizing fields can be limited. Also, by limiting the volume proportion of the non-magnetic layer in the powder magnetic core, it is possible to prevent saturation magnetic flux density from decreasing.

In addition, the insulative coating containing metallic salt phosphate and/or oxide provides superior lubrication. As a result, even if insulating coating rubs against each other during compacting, significant friction is not generated.

Thus, in the present invention, the advantages provided by the lubricant powder and the advantages provided by the insulative coating work together to significantly improve lubrication during compacting. As a result, destruction of the insulative coating during compacting can be prevented and the introduction of significant distortion in the metal magnetic particles are prevented. This makes it possible to obtain a powder magnetic core with low eddy current loss and hysteresis loss and with desired magnetic characteristics.

It is also preferable for the mean particle diameter of the lubricating powder to be no more than 1.0 microns. With this soft magnetic material, the lubricant powder can be interposed with a higher probability between the composite magnetic particles during the compacting operation performed to make the powder magnetic core. This makes it possible to more effectively improve lubrication during compacting.

It is also preferable for the proportion of the lubricating powder relative to the multiple composite magnetic particles to be at least 0.001 percent by mass and no more than 0.025 percent by mass. With this soft magnetic material, the creation of demagnetizing fields between the metal magnetic particles is further limited, while the proportion of the powder magnetic core taken up by the non-magnetic layer can be further reduced.

It is also preferable for the metallic soap to be at least one type of material selected from a group consisting of zinc stearate, calcium stearate, and aluminum stearate. With this soft magnetic material, the lubricating powder containing these materials provides superior lubrication so that friction between composite magnetic particles during compacting can be reduced in an effective manner.

According to another aspect of the present invention, a powder magnetic core is made from any of the soft magnetic materials described above. With this powder magnetic core, reduced eddy current loss and reduced hysteresis loss makes it possible to achieve magnetic characteristics with low iron loss. When a powder magnetic core is made, other organic matter may be added to improve strength and heat resistance. The advantages of the present invention are provided even with the presence of these organic materials.

According to another aspect of the present invention, a powder magnetic core includes a plurality of bonded composite magnetic particles and an inorganic lubricant having a hexagonal crystal structure interposed between the plurality of composite magnetic particles and present in a proportion of more than 0 and less than 0.05 percent by mass relative to the plurality of composite magnetic particles. An inorganic lubricant is a lubricant that has as its main component a material that does not contain carbon (C) or an allotrope of carbon, including graphite, which is an allotrope of carbon.

If the lubricant formed as fine particles contains an inorganic lubricant having a hexagonal crystal structure, the inorganic lubricant is formed with a layered structure. The cleavage that takes place in the layered structure of the inorganic lubricant provides superior lubrication even though a very low proportion of less than 0.05 percent by mass is used. More specifically, when compacting is being performed to make the powder magnetic core, the presence of the inorganic lubricant between the composite magnetic particles causes the outermost surface of the crystal layers of the inorganic lubricant that is contact with the composite magnetic particles to peel off, significantly reducing friction between particles. As a result, strong friction between the composite magnetic particles during compacting is prevented, and the introduction of significant distortion in the particles is restricted. Also, by using a proportion of inorganic lubricant that is less than 0.05 percent by mass, the proportion that the non-magnetic layer takes up in the powder magnetic core is prevented from being too high. Thus, compared to when the inorganic lubricant is not added, a higher density is achieved when the powder magnetic core is made using the same applied pressure. This makes it possible to obtain a powder magnetic core with high magnetic flux density and high strength.

Also, inorganic lubricants generally have a higher thermal decomposition temperature compared to that of organic lubricants, thus providing superior heat resistance. Thus, when making the powder magnetic core, heating at high temperatures can be performed without resulting in the degrading or softening of the inorganic lubricant. For these reasons, the present invention makes it possible to obtain a powder magnetic core with adequately reduced eddy current loss and hysteresis loss and high strength.

Also, it is preferable for the inorganic lubricant to contain at least one type of material selected from a group consisting of boron nitride, molybdenum disulfide, and tungsten disulfide. In this powder magnetic core, the inorganic lubricant containing these materials provides superior lubrication, heat resistance, and insulation properties. More specifically, when compacting is performed to make the powder magnetic core, the scale-like crystal layers peeling off from the outermost surface of the inorganic lubricant adhese to the surface of the composite magnetic particles. This improves insulation between the composite magnetic particles when a powder magnetic core is formed. Also, the inorganic lubricant containing these materials does not contain carbon. As a result, it is possible to prevent significantly low electrical resistivity between composite magnetic particles caused by the presence of carbon in the powder magnetic core. For these reasons, the eddy current loss in the powder magnetic core is significantly reduced.

It is also preferable for each of the plurality of composite magnetic particles to contain a metal magnetic particle and an insulative coating surrounding the surface of the metal magnetic particle. With this powder magnetic core, the lubrication provided by the inorganic lubricant prevents the destruction of the insulative coating during the compacting performed to make the powder magnetic core. This makes it possible to obtain a powder magnetic core with low eddy current loss.

It is also preferable for the proportion of the inorganic lubricant relative to the plurality of the composite magnetic particles to be at least 0.0005 percent by mass and no more than 0.01 percent by mass. With this powder magnetic core, the inorganic lubricant provides especially superior lubrication in this range, allowing the advantages of the inorganic lubricant described above to be provided in an especially prominent manner.

It is also preferable for the powder magnetic core to further include a thermoplastic resin between the individual composite magnetic particles at a proportion of at least 0.001 percent by mass and no more than 0.1 percent by mass relative to the plurality of the composite magnetic particles. With this powder magnetic core, the inclusion of thermoplastic resin in addition to the inorganic lubricant makes it possible to bond adjacent composite magnetic particles firmly. The adhesive effect provided by the thermoplastic resin improves the strength of the powder magnetic core. Also, when the compact is processed to make the powder magnetic core, the adhesive effect prevents composite magnetic particles from peeling off of surfaces being processed due to processing stress. As a result, surfaces to be processed can have low surface roughness and good machinability. Also, the addition of thermoplastic resin can improve insulation between composite magnetic particles. As a result, creation of eddy currents between particles and iron loss in the powder magnetic core can be further reduced.

These advantages are adequately provided with a proportion of thermoplastic resin of at least 0.001 percent by mass. Also, by using a proportion of thermoplastic resin that is no more than 0.1 percent by mass, the proportion that the non-magnetic layer takes up in the powder magnetic core is prevented from being too high. This prevents reduction in the magnetic flux density of the powder magnetic core.

It is preferable for the powder magnetic core to have a fill ratio of at least 95 percent. With this type of powder magnetic core, the use of an inorganic lubricant makes it possible to limit the amount of lubricant added while achieving superior lubrication, thus making it possible to make a powder magnetic core with an improved fill ratio. This improves the strength of the powder magnetic core, providing magnetic characteristics with a high magnetic flux density.

According to another aspect of the present invention, a soft magnetic material is used to make any of the powder magnetic cores described above. The soft magnetic material includes a mixture containing a plurality of composite magnetic particles and an inorganic lubricant. With this soft magnetic material, it is possible to make a powder magnetic core with superior magnetic characteristics.

A method for making a powder magnetic core according to the present invention is a method for making any of the powder magnetic cores described above. The method for making a powder magnetic core includes a step for forming a compact by compacting a mixture containing a plurality of composite magnetic particles and an inorganic lubricant and a step for heating the compact at a temperature of at least 400 deg C.

With this method for making a powder magnetic core, the superior heat resistance of the inorganic lubricant prevents the degradation of magnetic characteristics of the composite magnetic particles due to thermal decomposition of the inorganic lubricant even if heating is performed at a high temperature of at least 400 deg C. Also, by heating at a high temperature, distortions present in the composite magnetic particles can be adequately reduced. This makes it possible to make a powder magnetic core with low hysteresis loss.

With the present invention as described above, it is possible to provide a soft magnetic material that can provide desired magnetic characteristics after compacting and a powder magnetic core made from this soft magnetic material. Also, with the present invention, it is possible to provide a powder magnetic core, a soft magnetic material, and method for making a powder magnetic core having desired magnetic characteristics.

DETAILED DESCRIPTION OF THE PREFERRED EMBODIMENT

The embodiments of the present invention will be described, with references to the figures.

First Embodiment

Figure 1:
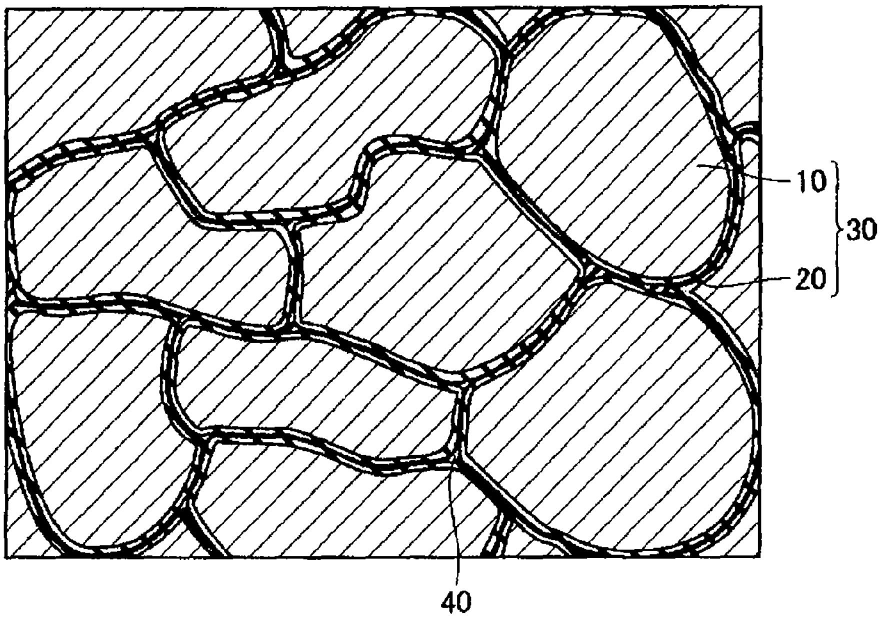
FIG. 1: A simplified cross-section drawing of a powder magnetic core made using a soft magnetic material according to a first embodiment of the present invention.

As shown in FIG. 1, a powder magnetic core includes a plurality of composite magnetic particles 30 formed from a metal magnetic particle 10 and an insulative coating 20 surrounding the surface of the metal magnetic particle 10. An organic matter 40 is present between the plurality of the composite magnetic particles 30. The composite magnetic particles 30 are bonded to each other by the organic matter 40 or by the engagement of the projections and indentations of the composite magnetic particles 30.

A soft magnetic material according to this embodiment used to make the powder magnetic core shown in FIG. 1 includes: the plurality of composite magnetic particles 30 formed from the metal magnetic particle 10 and the insulative coating 20; and a lubricating powder (a lubricant in the form of fine particles) added at a predetermined proportion to the composite magnetic particles 30 and serving as the organic matter 40 in the powder magnetic core of FIG. 1 when compacted.

The metal magnetic particle 10 can be formed from, e.g., iron (Fe), an iron (Fe)-silicon (Si)-based alloy, an iron (Fe)-nitrogen (N)-based alloy, an iron (Fe)-nickel (Ni)-based alloy, an iron (Fe)-carbon (C)-based alloy, an iron (Fe)-boron (B)-based alloy, an iron (Fe)-cobalt (Co)-based alloy, an iron (Fe)-phosphorous (P)-based alloy, an iron (Fe)-nickel (Ni)-cobalt (Co)-based alloy, or an iron (Fe)-aluminum (Al)-silicon (Si)-based alloy. The metal magnetic particle 10 can be a single metal or an alloy.

The insulative coating 20 contains metallic salt phosphate and/or oxide. In addition to ferric phosphate, which is a phosphate of iron, examples of metallic salt phosphates include manganese phosphate, zinc phosphate, calcium phosphate, and aluminum phosphate. Also, the metallic salt phosphate can be a composite metallic salt of phosphate such as ferric phosphate doped with a small amount of aluminum. Examples of oxides include silicon oxide, titanium oxide, aluminum oxide, and zirconium oxide. Alloys of these metals can be used as well. The insulative coating 20 can be formed as a single layer as shown in the figure or can be formed as multiple layers.

The lubricating powder can be formed from a metallic soap such as zinc stearate, lithium stearate, calcium stearate, aluminum stearate, lithium palmitate, calcium palmitate, lithium oleate, and calcium oleate or an inorganic lubricant having a hexagonal crystal structure such as boron nitride (BN), molybdenum disulfide ($MoS_2$), tungsten disulfide ($WS_2$), or graphite.

The proportion of the lubricating powder relative to the plurality of the composite magnetic particles 30 is at least 0.001 percent by mass and no more than 0.1 percent by mass. The mean particle diameter is no more than 2.0 microns. It would be preferable for the proportion of the lubricating powder relative to the plurality of the composite magnetic particles 30 to be at least 0.001 percent by mass and no more than 0.025 percent by mass. It is preferable for the lubricating powder to have a mean particle diameter of no more than 1.0 microns. The mean particle diameter referred to here indicates a 50% particle diameter D, i.e., with a particle diameter histogram measured using the laser scattering diffraction method, the particle diameter of particles for which the sum of the mass starting from the lower end of the histogram is 50% of the total mass.

The soft magnetic material according to the first embodiment of the present invention includes the plurality of composite magnetic particles 30 formed from the metal magnetic particle 10 and the insulative coating 20 surrounding the surface of the metal magnetic particle 10 and containing a metallic salt phosphate and/or oxide as well as the lubricating powder containing a metallic soap and added to the plurality of the composite magnetic particles 30 at a proportion of at least 0.001 percent by mass and no more than 0.1 percent by mass. The mean particle diameter of the lubricating powder is no more than 2.0 microns.

Also, according to another aspect, the soft magnetic material according to the first embodiment of the present invention includes the plurality of composite magnetic particles 30 formed from the metal magnetic particle 10 and the insulative coating 20 surrounding the surface of the metal magnetic particle 10 and containing a metallic salt phosphate and/or oxide as well as a fine-particle lubricating powder added to the plurality of the composite magnetic particles 30 at a proportion of at least 0.001 percent by mass and no more than 0.1 percent by mass.

Next, a method for making the soft magnetic material according to this embodiment and making the powder magnetic core shown in FIG. 1 from the soft magnetic material will be described.

First, a predetermined coating operation is performed on the metal magnetic particles 10 to form the composite magnetic particles 30 in which the metal magnetic particles 10 are coated by the insulative coating 20. Also, a sieve with an appropriate mesh grain is used for sorting to prepare the lubricating powder with a mean particle diameter of no more than 2.0 microns. It is also possible to use a commercially available metallic soap with a mean particle diameter of 0.8 microns to 1.0 microns (e.g., "MZ-2" from NOF Corp. Ltd.) as the lubricating powder. Next, the lubricating powder is added at the predetermined proportion to the composite magnetic particles 30. A V-mixer is used to mix these and form the soft magnetic material of this embodiment. There are no special restrictions on the mixing method used.

Next, the obtained soft magnetic material is placed in a die and shaped, e.g., at a pressure of 700 MPa to 1500 MPa. This compresses the soft magnetic material and results in a compact. It is preferable for the atmosphere in which the compacting is done to be an inert gas atmosphere or a decompressed atmosphere. This makes it possible to limit oxidation of the composite magnetic particles 30 caused by oxygen in the open air.

Compared to the mean particle diameter of approximately 5 microns to 10 microns used for the lubricant in the conventional technology, this embodiment uses a lubricating powder with a relatively small mean particle diameter of no more than 2.0 microns. Thus, even with the same amount of lubricant added (proportion relative to the plurality of composite magnetic particles 30), a greater number of lubricant particles will be present per unit volume in the soft magnetic material. This makes it possible for there to be a higher probability that the lubricant particle will be present between the composite magnetic particles 30. Also, the insulative coating 20 containing the metallic salt phosphate or oxide itself has superior lubricating properties. This insulative coating 20 and the lubricating powder positioned between the composite magnetic particles 30 make it possible to obtain superior lubrication during the compacting operation described above.

Also, zinc stearate has a layer structure and provides slipping properties in which surface layers peel away successively. Furthermore, zinc stearate has a high degree of hardness compared to calcium stearate and aluminum stearate. For these reasons, especially superior lubrication properties can be obtained when zinc stearate is used as the lubricating powder.

Next, the compact obtained by compacting is heated at a temperature of at least 400 deg C. and less than the thermal decomposition temperature of the insulative coating 20. This removes distortions and dislocations present in the compact. During this operation, since heating is performed at a temperature less than the thermal decomposition temperature of the insulative coating 20, the heating will not degrade the insulative coating 20. After heating, the compact is processed as appropriate by extrusion, cutting, or the like, resulting in the powder magnetic core shown in FIG. 1.

With the soft magnetic material and powder magnetic core described above, superior lubrication properties are provided between the composite magnetic particles 30 during compacting. This prevents destruction of the insulative coating 20 during compacting and limits the introduction of significant distortion within the metal magnetic particles 10. Also, since the amount of lubricating powder added is no more than 0.1 percent by mass, the proportion of the non-magnetic layer in the powder magnetic core is kept low. This prevents the distance between the metal magnetic particles 10 from becoming too large and prevents the generation of demagnetizing fields. For these reasons, eddy current loss and hysteresis loss in the powder magnetic core are reduced, and a powder magnetic core with low iron loss can be provided. Also, since the soft magnetic material of this embodiment has superior lubrication properties and flow properties, the soft magnetic material can fill a die in a uniform manner. This makes it possible to form the powder magnetic core as a uniform product with no density variations.

First Example

The examples described below were used to evaluate the soft magnetic material according to the first embodiment and the powder magnetic core made from this soft magnetic material.

First, for the composite magnetic particles 30, a predetermined amount of zinc stearate (product name “MZ-2” from NOF Corp. Ltd., 0.8 microns mean particle diameter) is added as a lubricating powder to phosphate-coated iron powder (product name “Somaloy500” from Hoganas Corp.). Next, a V-mixer is used to mix for 1 hour. Multiple types of soft magnetic materials containing different amounts of zinc stearate relative to the phosphate-coated iron powder were prepared. For comparison, multiple types of soft magnetic materials containing different amounts of zinc stearate added to iron powder with no phosphate coating (product name “ABC100.30” from Hoganas Corp.) were prepared.

In order to evaluate lubrication of the soft magnetic material, apparent density according to “JIS Z 2504” and flowability according to “JIS Z 2502” were measured for the different prepared soft magnetic materials. Apparent density, also referred to as pack density, is determined from the weight and volume when a cylindrical container with a fixed volume is filled with a powder that is placed in free fall according to a fixed method. Higher values indicate better lubrication properties for the soft magnetic material. Also, flowability is also known as fluidity and flow rate and describes the ease with which powder flows. Flowability is indicated as the time required for a fixed weight (50 g) of mixed powder to flow from an orifice having a fixed dimension (4.0 mm diameter). Lower values indicate better lubrication properties for the soft magnetic material.

Figure 2:
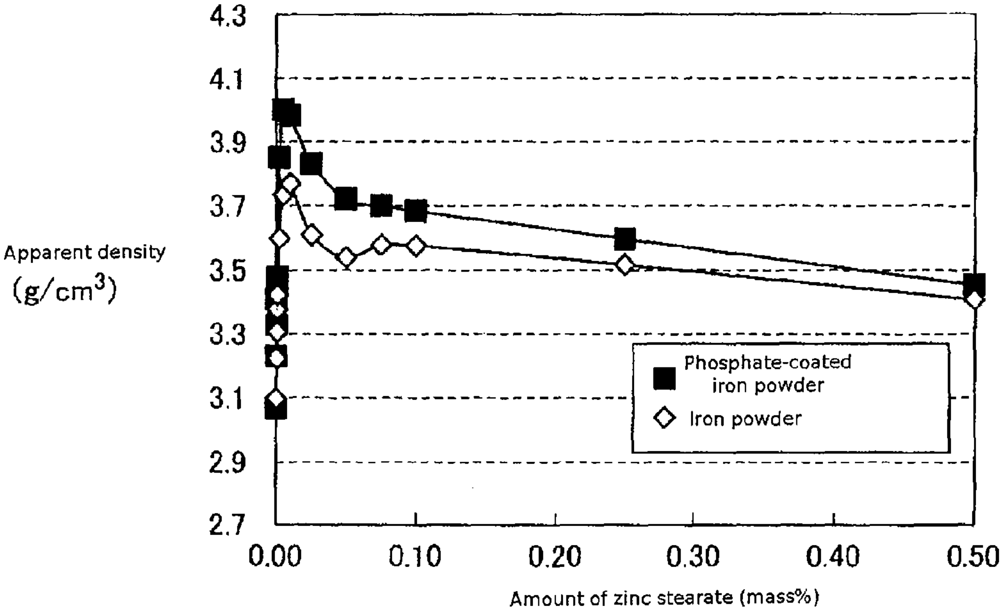
FIG. 2: A graph showing the relationship between amounts of zinc stearate and apparent density in a first example of the present invention.
Figure 3:
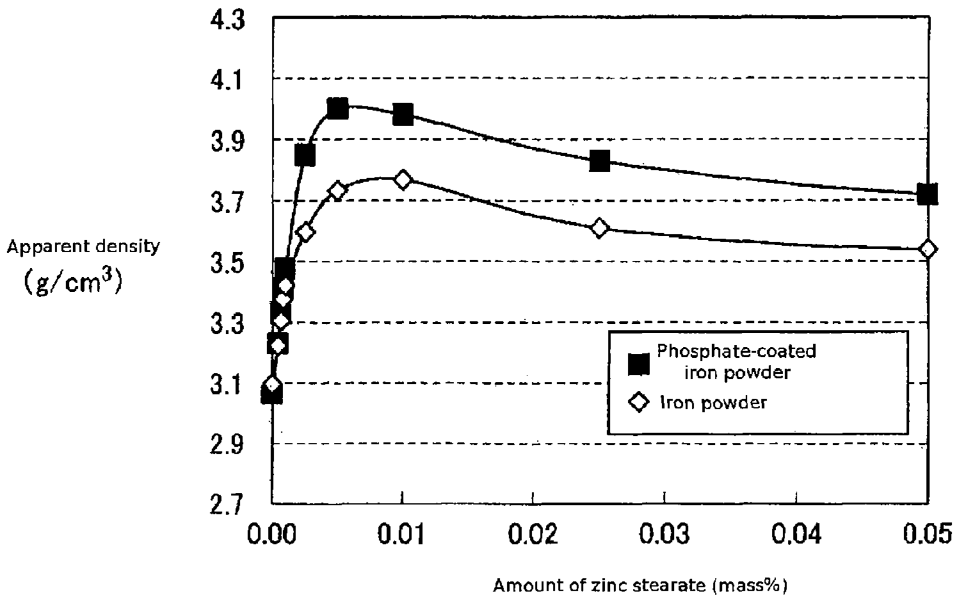
FIG. 3: Another graph showing the relationship between amounts of zinc stearate and apparent density in the first example of the present invention.
Figure 4:
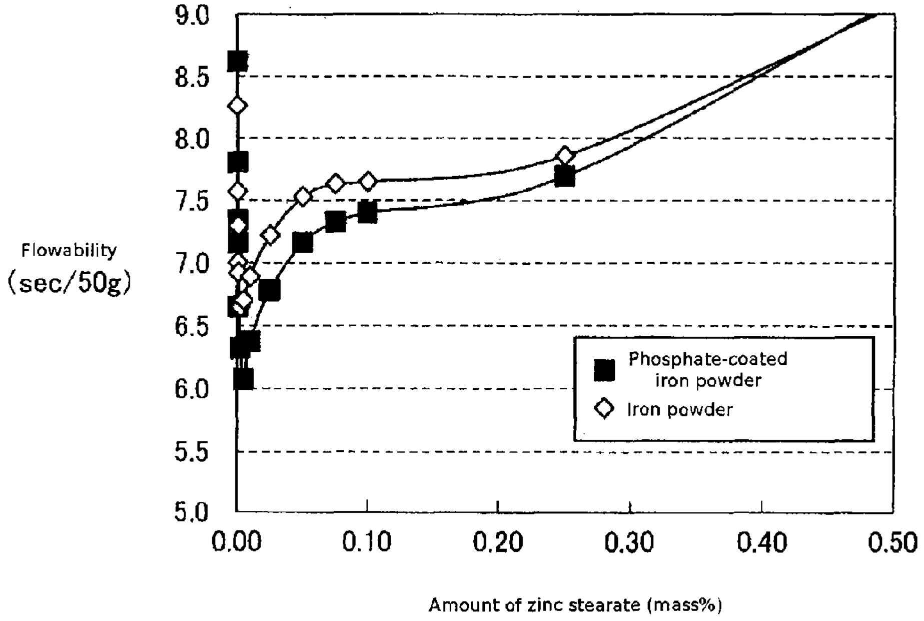
FIG. 4: A graph showing the relationship between amounts of zinc stearate and flowability in the first example of the present invention.
Figure 5:
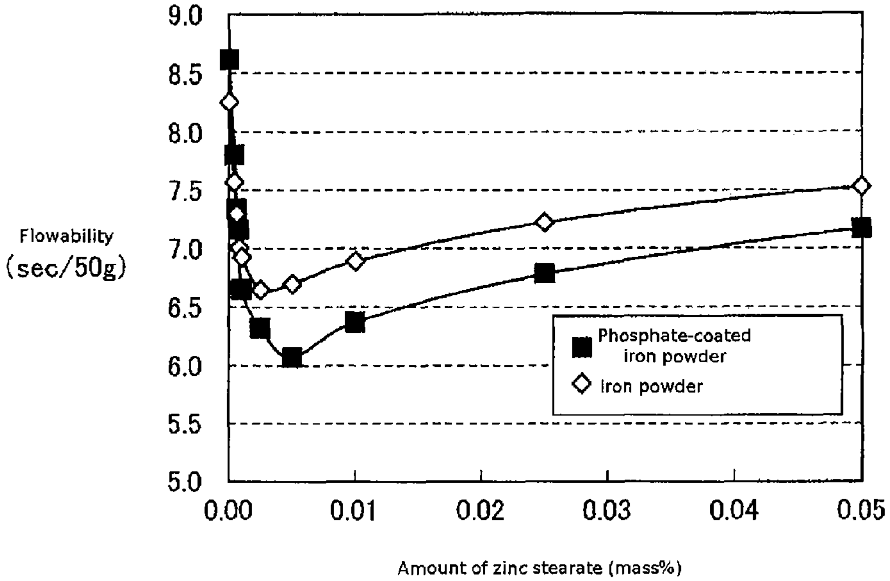
FIG. 5: Another graph showing the relationship between amounts of zinc stearate and flowability in the first example of the present invention.

FIG. 3 and FIG. 5 are the measurement results from FIG. 2 and FIG. 4 respectively. The measurement results for zinc stearate amounts of 0 to 0.05 percent by mass are shown in detail.

As shown in FIG. 2 and FIG. 3, when the amount of zinc stearate added was in the range of at least 0.001 percent by mass and no more than 0.1 percent by mass, a high apparent density was obtained if phosphate-coated iron powder is used. Also, especially high apparent density is obtained when the range of added zinc stearate was no more than 0.025 percent by mass. Similarly, as shown in FIG. 4 and FIG. 5, when the amount of zinc stearate added was in the range of at least 0.001 percent by mass and no more than 0.1 percent by mass, good flowability was obtained if phosphate-coated iron powder was used. Also, especially good flowability was obtained when the range of added zinc stearate was no more than 0.025 percent by mass.

Second Example

Next, zinc stearate from NOF Corp. Ltd. was prepared as the lubricating powder. Dry sieving was performed to sort the powder into four type of zinc stearate with mean particle diameters of 0.8 microns, 1.6 microns, 2.3 microns, and 7.5 microns. Next, predetermined amounts were added to phosphate-coated iron powder (product name “Somaloy500” from Hoganas Corp.) serving as the composite magnetic particles 30, and mixing was performed as in the first example. This resulted in multiple types of soft magnetic materials with different zinc stearate mean particle diameters and different amounts of zinc stearate added to the phosphate-coated iron powder.

Figure 8:
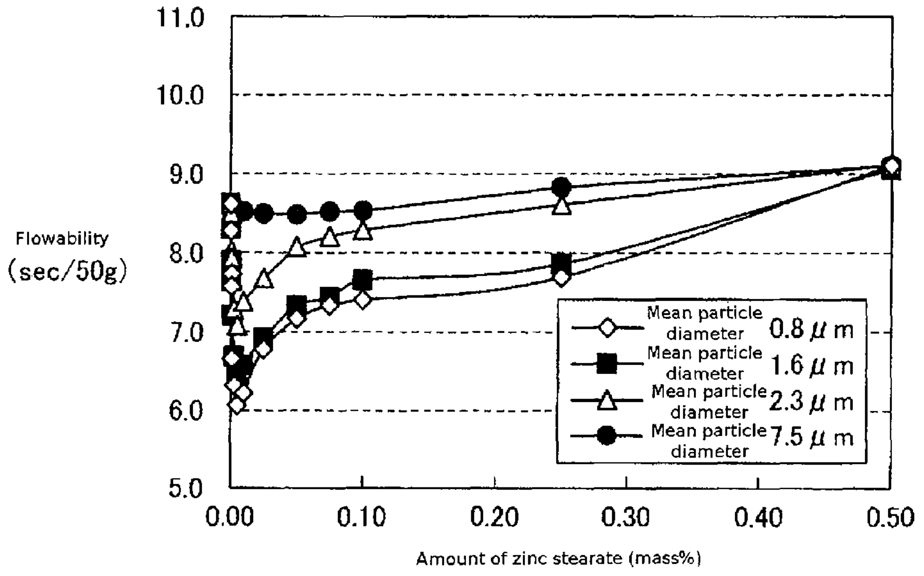
FIG. 8: A graph showing the relationship between the mean particle diameters and amounts of zinc stearate and flowability in the second example of the present invention.
Figure 9:
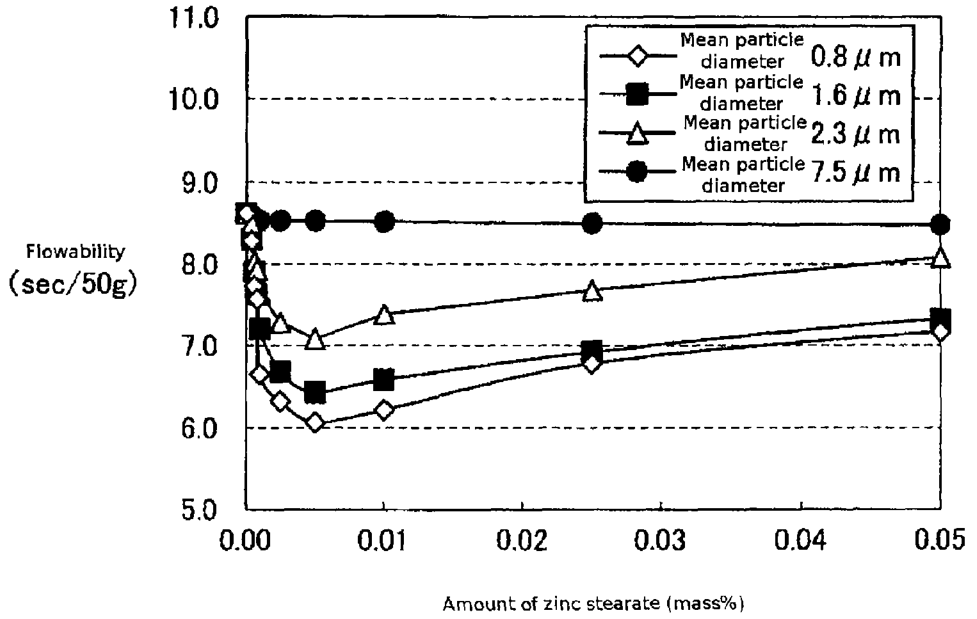
FIG. 9: Another graph showing the relationship between the mean particle diameters and amounts of zinc stearate and flowability in the second example of the present invention.

The soft magnetic materials prepared in this manner were measured for apparent density and flowability, as in the first example. FIG. 7 and FIG. 9 are the measurement results from FIG. 6 and FIG. 8 respectively. The measurement results for zinc stearate amounts of 0 to 0.05 percent by mass are shown in detail.

Figure 6:
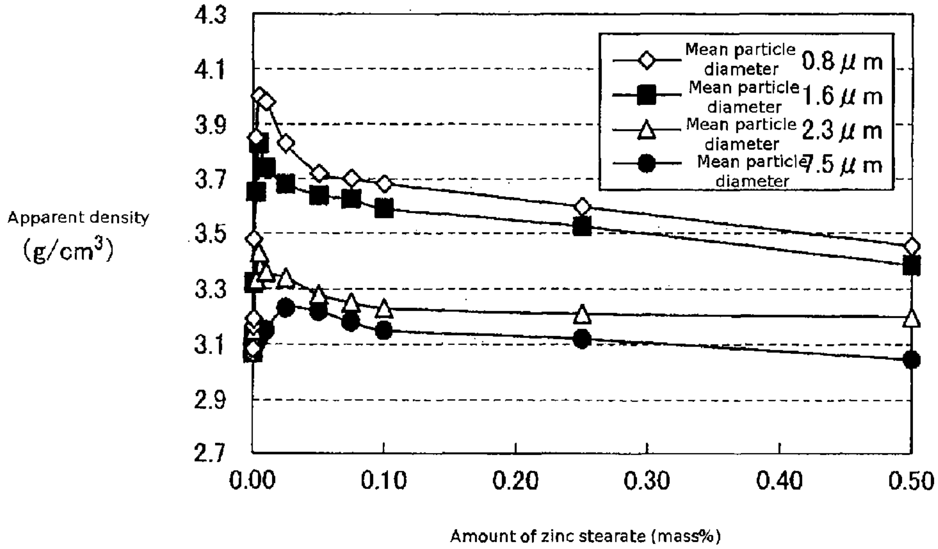
FIG. 6: A graph showing the relationship between the mean particle diameters and amounts of zinc stearate and apparent density in a second example of the present invention.
Figure 7:
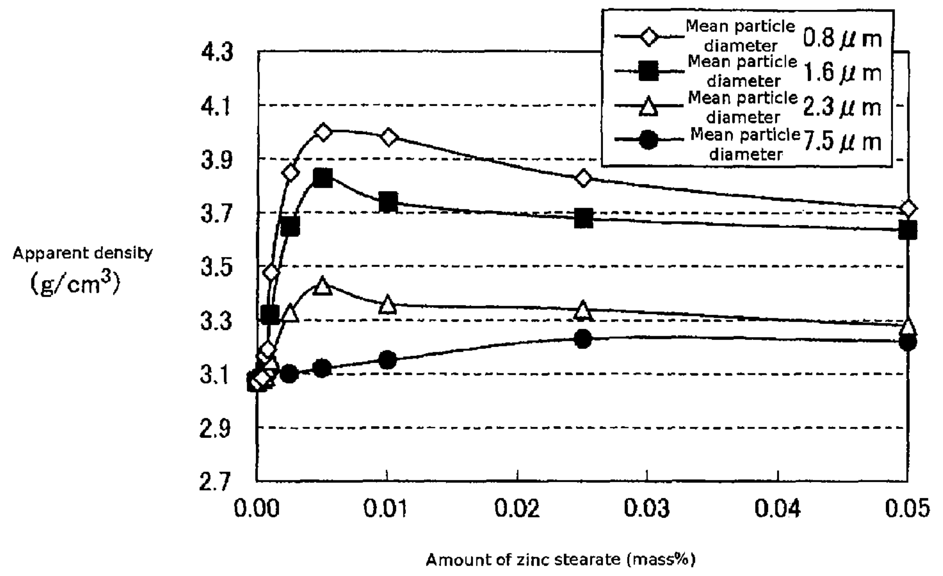
FIG. 7: Another graph showing the relationship between the mean particle diameters and amounts of zinc stearate and apparent density in a second example of the present invention.

As FIG. 6 and FIG. 7 show, high apparent density is obtained when the mean particle diameter of the zinc stearate is no more than 2.0 microns. Also, especially high apparent density is obtained when the mean particle diameter of the zinc stearate was no more than 1.0 microns. Similarly, as shown in FIG. 8 and FIG. 9, good flowability is obtained when the mean particle diameter of the zinc stearate was no more than 2.0 microns. Also, especially good flowability is obtained when the mean particle diameter of the zinc stearate was no more than 1.0 microns.

Based on the results from the first example and the second example described above, it was confirmed that the soft magnetic material of the present invention provides good lubrication properties. While results similar to those discussed for the first example and the second example can be obtained for other types of metallic soaps (e.g., aluminum stearate, calcium stearate), the use of zinc stearate as the lubricating powder provides the best results for both apparent density and flowability. This may be because zinc stearate is formed with a layered structure, but there may be other factors as well.

Third Example

Several types of soft magnetic materials used in the second example were selected and compacted to form ring-shaped powder magnetic cores (30 mm outer diameter×20 mm inner diameter×5 mm thickness). A compacting pressure of 1078 MPa (=11 ton/$cm^2$) was applied. The obtained powder magnetic cores were uniformly wound with coils (300 primary windings and 20 secondary windings), and the magnetic characteristics of the powder magnetic cores were evaluated. A BH tracer from Riken Denshi Co. (model ACBH-100K) was used for evaluation, with an excitation magnetic flux density of 10 kG (kilogauss) and a measurement frequency of 1000 Hz. Table 1 shows the measured iron loss values $W_{10/1000}$ of the powder magnetic cores.

The iron loss is indicated as the sum of hysteresis loss and eddy current loss, and the value is determined using the following formula, where Kh is a hysteresis loss coefficient, Ke is an eddy current loss coefficient, and f is frequency.

$$W=Kh\times f+Ke\times f^2$$

TABLE 1

| Mean particle diameter of zinc stearate | Iron loss $W_{10/1000}$ (W/kg) Amount of zinc stearate added (mass %) | | | | | | | | |
|---|---|---|---|---|---|---|---|---|---|
| (μm) | 0 | 0.0004 | 0.0010 | 0.0050 | 0.0100 | 0.0250 | 0.0500 | 0.1000 | 0.2500 |
| 0.8 | 305 | 204 | 159 | 145 | 162 | 180 | 185 | 195 | 324 |
| 1.6 | 305 | 245 | 191 | 174 | 194 | 216 | 222 | 234 | 389 |
| 2.3 | 305 | 367 | 286 | 261 | 292 | 324 | 333 | 351 | 583 |
| 7.5 | 305 | 477 | 372 | 339 | 379 | 421 | 433 | 456 | 758 |

As shown in Table 1, low iron loss was obtained for soft magnetic materials in which the mean particle diameter of the zinc stearate was no more than 2.0 microns and the amount added was at least 0.001 percent by mass and no more than 0.1 percent by mass. Also, especially low iron loss was obtained for soft magnetic materials in which the amount of zinc stearate added was no more than 0.025 percent by mass.

If the amount of the zinc stearate used as lubricating powder added is too small, the advantage provided by the addition of the zinc stearate will be inadequate, leading to the destruction of the phosphate coating serving as the insulative coating 20 during compacting. Also, flowability between particles is reduced, leading to increased distortion being introduced into the iron particles during compacting. It is believed that eddy current loss and hysteresis loss increase for these reasons, leading to increased iron loss. If the amount of zinc stearate added is too high, there is an increased amount of the non-magnetic layer between iron particles. This is believed to generate demagnetizing fields between iron particles, leading to increased iron loss.

Also, if the particle size of the zinc stearate is small, the zinc stearate can be distributed uniformly and thinly on the surface of the iron particles, maximizing the lubrication effect. If the particle size of the zinc stearate is large, the probability of its presence between iron particles is less even if the amount added is the same. Thus, the lubrication effect obtained during compacting is reduced. Thus, in this example, powder magnetic core iron loss appears to be reduced when the mean particle diameter zinc stearate is no more than 2.0 microns.

Based on the results from the third example described above, it was confirmed that the powder magnetic core of the present invention provides improved magnetic characteristics.

Second Embodiment

Figure 10:
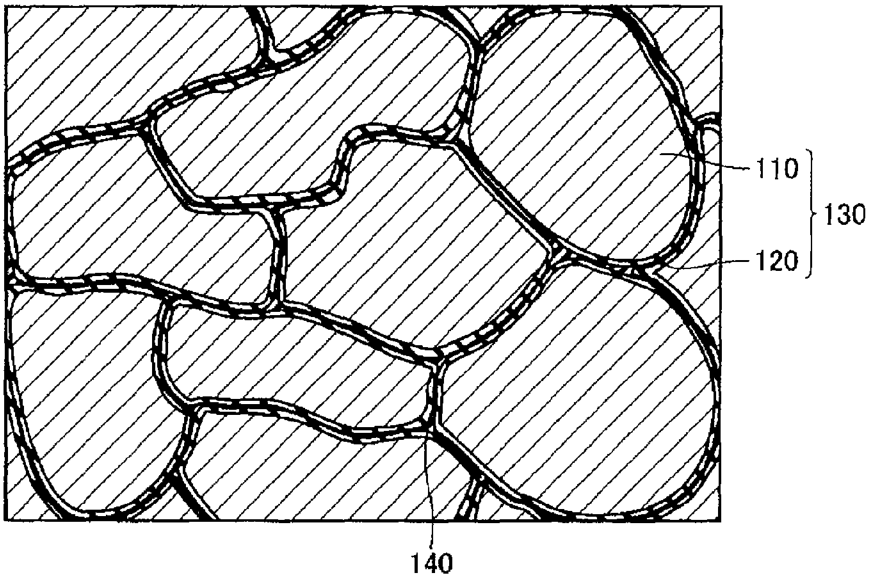
FIG. 10: A simplified cross-section drawing of a powder magnetic core made using a soft magnetic material according to a second embodiment of the present invention.

As shown in FIG. 10, a powder magnetic core includes a plurality of composite magnetic particles 130 formed from a metal magnetic particle 110 and an insulative coating 120 surrounding the surface of the metal magnetic particle 110. An inorganic lubricant 140 having a hexagonal crystal structure is present between the plurality of composite magnetic particles 130. The composite magnetic particles 130 are bonded to each other by the inorganic lubricant 140 or by the engagement of the projections and indentations of the composite magnetic particles 130.

The inorganic lubricant 140 is formed with a hexagonal crystal structure such as boron nitride (BN), molybdenum disulfide ($MoS_2$), tungsten disulfide ($WS_2$), or graphite. The inorganic lubricant 140 is contained in the powder magnetic core at a proportion of more than 0 and less than 0.05 percent by mass relative to the plurality of composite magnetic particles 130. It would be preferable for the inorganic lubricant 140 to be contained in the powder magnetic core at a proportion of at least 0.0005 percent by mass and no more than 0.01 percent by mass. It is more preferable for the inorganic lubricant 140 to be contained in the powder magnetic core at a proportion of at least 0.0005 percent by mass and no more than 0.001 percent by mass.

The metal magnetic particle 110 can be formed from, e.g., iron (Fe), an iron (Fe)-silicon (Si)-based alloy, an iron (Fe)-nitrogen (N)-based alloy, an iron (Fe)-nickel (Ni)-based alloy, an iron (Fe)-carbon (C)-based alloy, an iron (Fe)-boron (B)-based alloy, an iron (Fe)-cobalt (Co)-based alloy, an iron (Fe)-phosphorous (P)-based alloy, an iron (Fe)-nickel (Ni)-cobalt (Co)-based alloy, or an iron (Fe)-aluminum (Al)-silicon (Si)-based alloy. The metal magnetic particle 110 can be a single metal or an alloy.

It is preferable for the mean particle diameter of the metal magnetic particles 110 to be at least 100 microns and no more than 300 microns. With a mean particle diameter of at least 100 microns, it is possible to reduce the proportion, relative to the entire metal magnetic particle 110, of the region that is affected by stress-strain caused by the surface energy of the metal magnetic particle 110. This stress-strain caused by the surface energy of the metal magnetic particle 110 is the stress-strain generated due to distortions and defects present on the surface of the metal magnetic particle 110. This can lead to obstruction of domain wall displacement. As a result, reducing the proportion of this stress-strain relative to the entire metal magnetic particle 110 reduces hysteresis loss in the powder magnetic core.

When a high-frequency magnetic field is applied to the metal magnetic particle 110, the skin effect causes a magnetic field to form only on the surface of the particle, with a region in which a magnetic field is not formed being created within the particle. This region within the particle with no magnetic field increases the iron loss of the metal magnetic particle 110. By setting the mean particle diameter of the metal magnetic particle 110 to be no more than 300 microns, the creation of a region with no magnetic field within the particle can be limited, thus reducing iron loss for the powder magnetic core.

The mean particle diameter referred to here indicates a 50% particle diameter D, i.e., with a particle diameter histogram measured using the laser scattering diffraction method, the particle diameter of particles for which the sum of the mass starting from the lower end of the histogram is 50% of the total mass.

The insulative coating 120 can be formed, for example, by treating the metal magnetic particle 110 with phosphoric acid. It is preferable for the insulative coating 120 to contain an oxide. In addition to ferric phosphate, which is a phosphate of iron, examples of the insulative coating 120 containing an oxide include oxide insulators such as manganese phosphate, zinc phosphate, calcium phosphate, aluminum phosphate, silicon oxide, titanium oxide, aluminum oxide, and zirconium oxide. The insulative coating 120 can be formed as a single layer as shown in the figure or can be formed as multiple layers.

The insulative coating 120 serves as an insulation layer between the metal magnetic particles 110. By covering the metal magnetic particle 110 with the insulative coating 120, the electrical resistivity ρ of the powder magnetic core can be increased. As a result, the flow of eddy currents between the metal magnetic particle 110 can be limited and the iron loss resulting from eddy current loss can be reduced.

It is preferable for the average thickness of the insulative coating 120 to be at least 5 nm and no more than 100 nm. The average thickness referred to here is determined in the following manner. Film composition is obtained through composition analysis (TEM-EDX: transmission electron microscope energy dispersive X-ray spectroscopy) and atomic weight is obtained through inductively coupled plasma-mass spectrometry (ICP-MS). These are used to determine equivalent thickness. Furthermore, TEM photographs are used to directly observe the coating and confirm the order of the calculated equivalent thickness.

By setting the average thickness of the insulative coating 120 to be at least 5 nm, the tunnel current flowing in the coating is limited, thus restricting increased eddy current loss caused by this tunnel current. Also, by setting the average thickness of the insulative coating 120 to be no more than 100 nm, the distance between the metal magnetic particles 110 is prevented from being too large. As a result, the creation of a demagnetizing field between the metal magnetic particles 110 is prevented, and hysteresis loss caused by the creation of a demagnetizing field is prevented from increasing. Also, by limiting the volume proportion of the non-magnetic layer in the powder magnetic core, it is possible to limit reductions in the magnetic flux density of the powder magnetic core.

A thermoplastic resin can be interposed between the plurality of the composite magnetic particles 130 in addition to the inorganic lubricant 140. If this is done, the thermoplastic resin is contained in the powder magnetic core at a proportion of at least 0.001 percent by mass and no more than 0.1 percent by mass relative to the plurality of the composite magnetic particles 130. The thermoplastic resin bonds firmly between the plurality of the composite magnetic particles 130, improving the strength of the powder magnetic core. Examples of materials that can be used as the thermoplastic resin include thermoplastic polyimide, a thermoplastic polyamide, a thermoplastic polyamide-imide, high molecular weight polyethylene, polyphenylene sulfide, polyamide-imide, polyether sulfone, polyether imide, or polyether ether ketone. The high molecular weight polyethylene refers to a polyethylene with a molecular weight of at least 100,000.

A powder magnetic core according to the second embodiment of the present invention includes the plurality of the composite magnetic particles 130 bonded to each other and the inorganic lubricant 140 formed with a hexagonal crystal structure and interposed between the plurality of the composite magnetic particles 130 at a proportion of more than 0 and less than 0.05 percent by mass relative to the plurality of the composite magnetic particles 130.

A method for making the powder magnetic core shown in FIG. 10 is described herein. First, the metal magnetic particles 110 are prepared using water atomization or gas atomization. Next, a predetermined coating operation is performed on the metal magnetic particles 110 to form the composite magnetic particles 130, in which the metal magnetic particle 110 are covered by the insulative coating 120.

Next, a predetermined proportion of the inorganic lubricant 140 is added to the obtained composite magnetic particles 130, and a mixed powder is obtained by mixing with a V mixer. It is also possible to add a predetermined proportion of thermoplastic resin at the same time as the inorganic lubricant 140. There are no special restrictions on the mixing method. Examples of methods that can be used include mechanical alloying, a vibrating ball mill, a planetary ball mill, mechano-fusion, coprecipitation, chemical vapor deposition (CVD), physical vapor deposition (PVD), plating, sputtering, vaporization, and a sol-gel method.

Next, the obtained mixed powder is placed in a die and compacted, e.g., at a pressure of 700 MPa to 1500 MPa. This compresses the mixed powder and forms a compact. It is preferable for the compacting to be performed in an inert gas atmosphere or a decompressed atmosphere. This makes it possible to limit oxidation of the mixed powder caused by the oxygen in the open air.

During this compacting operation, the presence of the inorganic lubricant 140 between adjacent composite magnetic particles 130 prevents strong friction between the composite magnetic particles 130. Since the inorganic lubricant 140 provides superior lubrication, the insulative coating 120 formed on the outer surface of the composite magnetic particles 130 is not destroyed even though only a very small amount is used. As a result, the metal magnetic particles 110 stay coated by the insulative coating 120, making it possible for the insulative coating 120 to function as a reliable insulation layer between the metal magnetic particles 110.

Next, the compact obtained by compacting is heated at a temperature of at least 400 deg C. and less than the thermal decomposition temperature of the insulative coating 120. This removes distortions and dislocations present in the compact. Because the inorganic lubricant 140 has superior heat resistance, there is no thermal decomposition of the inorganic lubricant 140 even when heated at a high temperature of at least 400 deg C. As a result, the inorganic lubricant 140 is prevented from being dispersed in the metal magnetic particles 110, and the magnetic characteristics of the metal magnetic particle 110 can be kept from being degraded. Also, since heating is performed at a temperature that is less than the thermal decomposition temperature of the insulative coating 120, degrading of the insulative coating 120 by the heating operation is prevented.

After heating, the compact is processed as appropriate by extrusion, cutting, or the like, resulting in the powder magnetic core shown in FIG. 10.

It is preferable for the powder magnetic core of FIG. 10 made as described above to have a fill ratio of at least 95 percent. The fill ratio of the powder magnetic core is determined by dividing the measured density of the measured core, which includes measurements for the insulative coating 120, the inorganic lubricant 140, and the space between the composite magnetic particles 130, by the theoretical density of the metal magnetic particles 110. The theoretical density of the metal magnetic particles 110 does not take into account the insulative coating 120 and the inorganic lubricant 140, but since these take up a very small proportion relative to the overall density, this method can provide a value that approximates the actual fill ratio. If the metal magnetic particle 110 is formed from an alloy, e.g., if the metal magnetic particle 110 is formed from an iron-cobalt alloy, the theoretical density of the metal magnetic particle 110 can be obtained by calculating (theoretical density of iron×volume ratio of iron in the metal magnetic particle 110)+(theoretical density of cobalt×volume ratio of cobalt in the metal magnetic particle 110).

With the powder magnetic core and method for making the powder magnetic core described above, the use of the inorganic lubricant 140 having superior lubrication makes it possible to perform compacting without destroying the insulative coating 120 even if only a very small amount of lubricant is added. As a result, the insulative coating 120, which is adequately protected, reduces eddy current loss in the powder magnetic core. Also, since the powder magnetic core can be made with a small amount of the inorganic lubricant 140 and with a high fill ratio, hysteresis loss in the powder magnetic core can be reduced. As a result, the reduction in eddy current loss and hysteresis loss makes it possible to reduce iron loss in the powder magnetic core. Also, aspects of the structure described for the first embodiment and the second embodiment, e.g., particle diameter and amounts added, can be implemented from one embodiment to another embodiment.

Fourth Example

The examples described below were used to evaluate the soft magnetic material according to the second embodiment and the powder magnetic core made from this soft magnetic material.

First, a V mixer is used for 2 hours to mix iron powder from Hoganas Corp. serving as the composite magnetic particles 130 (product name “Somaloy500”, 100 microns mean particle diameter with phosphate coating serving as the insulative coating 120 formed on the surface of the iron particles serving as the metal magnetic particles 110) and hexagonal boron nitride (h-BN) from Mizushima Fermalloy Co., Ltd. serving as the inorganic lubricant 140 (2 microns mean particle diameter). This results in 500 g of mixed powder. For this operation, different amounts of inorganic lubricant 140 were used to obtain multiple types of mixed powder containing different amounts of the inorganic lubricant 140. Also, composite magnetic particles 130 containing no inorganic lubricant 140 at all were also prepared for the purpose of comparison.

In order to evaluate lubrication of inorganic lubricant 140, apparent density according to “JIS Z 2504” and flowability according to “JIS Z 2502” were measured for the mixed powders. Apparent density, also referred to as pack density, is determined from the weight and volume when a cylindrical container with a fixed volume is filled with a powder that is placed in free fall according to a fixed method. Higher values indicate better lubrication properties of the inorganic lubricant 140. Also, flowability is also known as fluidity and flow rate and indicates the ease with which powder flows. Flowability is indicated as the time required for a fixed weight (50 g) of mixed powder to flow from an orifice having a fixed dimension (4.0 mm diameter). Lower values indicate better lubrication properties for the inorganic lubricant 140.

Figure 11:
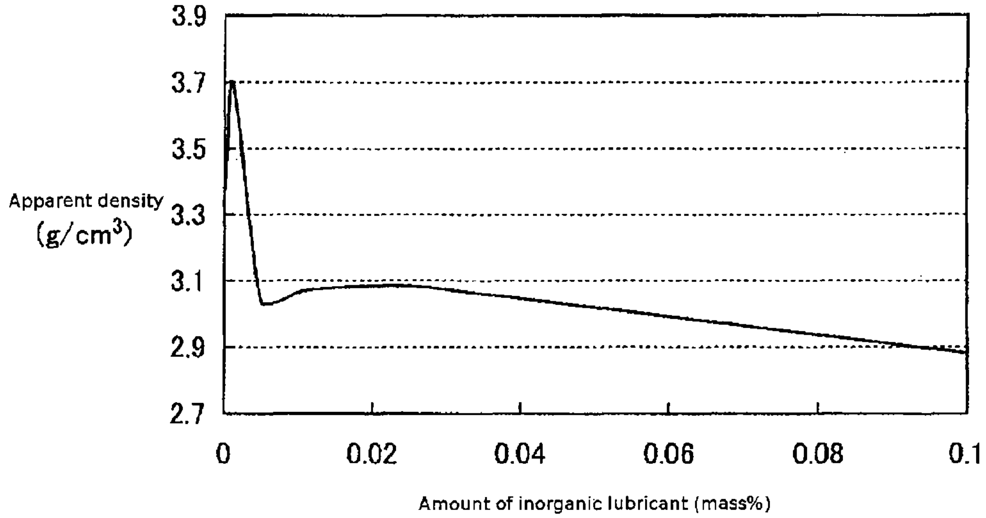
FIG. 11: A graph showing the relationship between amounts of inorganic lubricant and apparent density in a fourth example of the present invention.

The measurement results for apparent density and flowability of the mixed powders are shown in Table 2. These values are plotted in FIG. 11 and FIG. 12.

TABLE 2

| | | Amount of inorganic lubricant (mass %) | | | | | | |
|---|---|---|---|---|---|---|---|---|
| | | 0 | 0.0005 | 0.0010 | 0.0050 | 0.0100 | 0.0250 | 0.1000 |
| Apparent density ($g/cm^3$) | Somaloy500 | 3.07 | 3.58 | 3.70 | 3.04 | 3.06 | 3.07 | 2.88 |
| Flowability (sec) | Somaloy500 | 8.62 | 6.40 | 6.17 | 8.60 | 8.51 | 8.62 | 8.47 |

Figure 12:
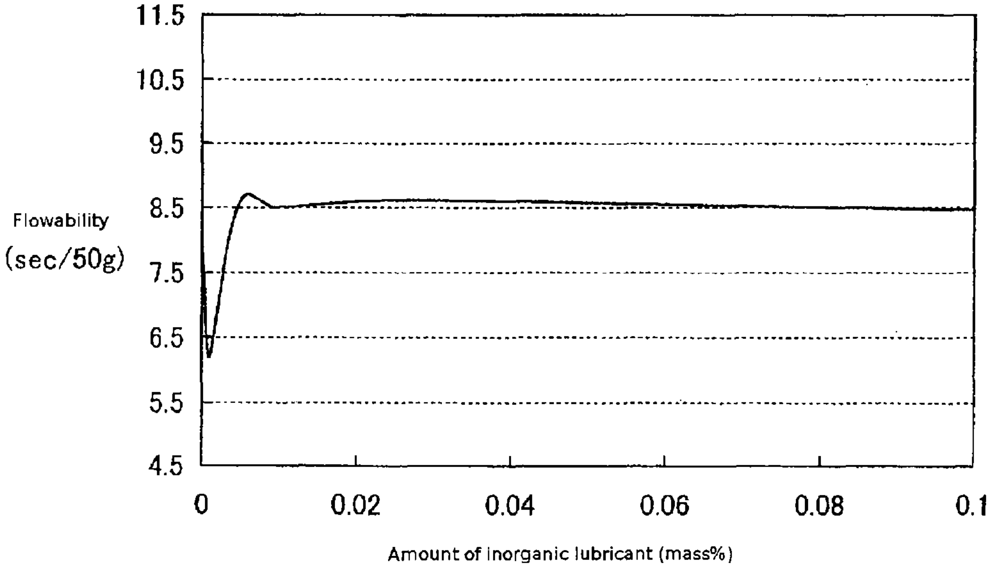
FIG. 12: A graph showing the relationship between amounts of inorganic lubricant and flowability in the fourth example of the present invention.

As shown in FIG. 12, the lowest flowability was similarly obtained at a content of approximately 0.001 percent by mass for the inorganic lubricant 140. Based of this, it was confirmed that the inorganic lubricant 140 can function adequately as a lubricant between the composite magnetic particles 130 even for low contents of the inorganic lubricant 140.

Fifth Example

The mixed powders prepared in the fourth example were compacted at a surface pressure of 10 $ton/cm^2$ to form ring-shaped compacts (34 mm outer diameter×20 mm inner diameter×5 mm height). Coils were wound on the obtained compact (300 primary windings and 20 secondary windings), a magnetic field was applied, and iron loss was measured using a BH curve tracer (at an excitation magnetic flux density of 1 (T: tesla) and a measurement frequency of 1 kHz).

Next, the compact was heated for 1 hour in a nitrogen atmosphere at a temperature of 400 deg C. The iron loss of the compact after heating was measured using the same method, and the B100 magnetic flux density (the magnetic flux density when a magnetic field of 100 Oe (oersteds) is applied) was measured. The density of the compact was also measured.

Figure 13:
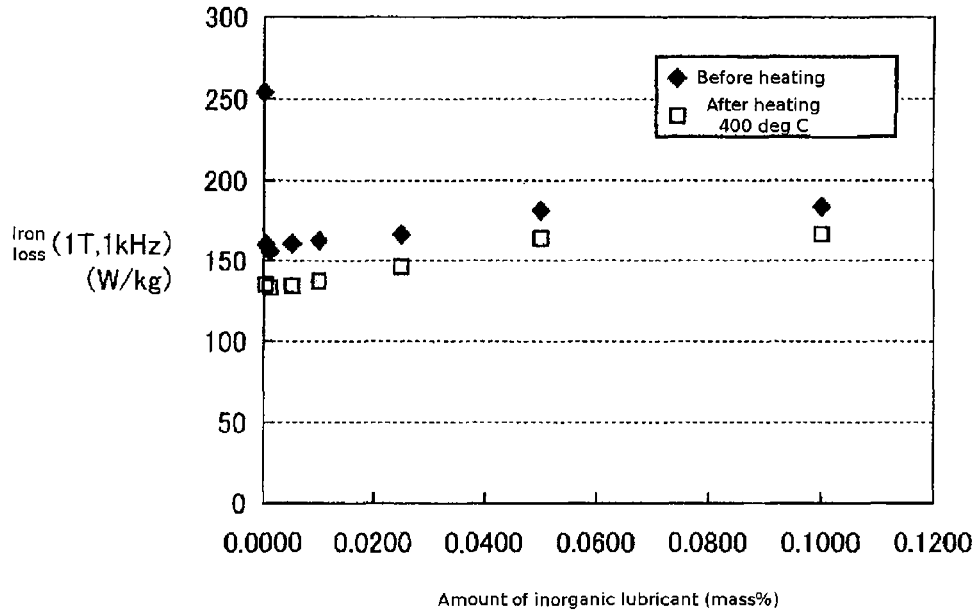
FIG. 13: A graph showing the relationship between amounts of inorganic lubricant and iron loss of a compact in a fifth example of the present invention.
Figure 14:
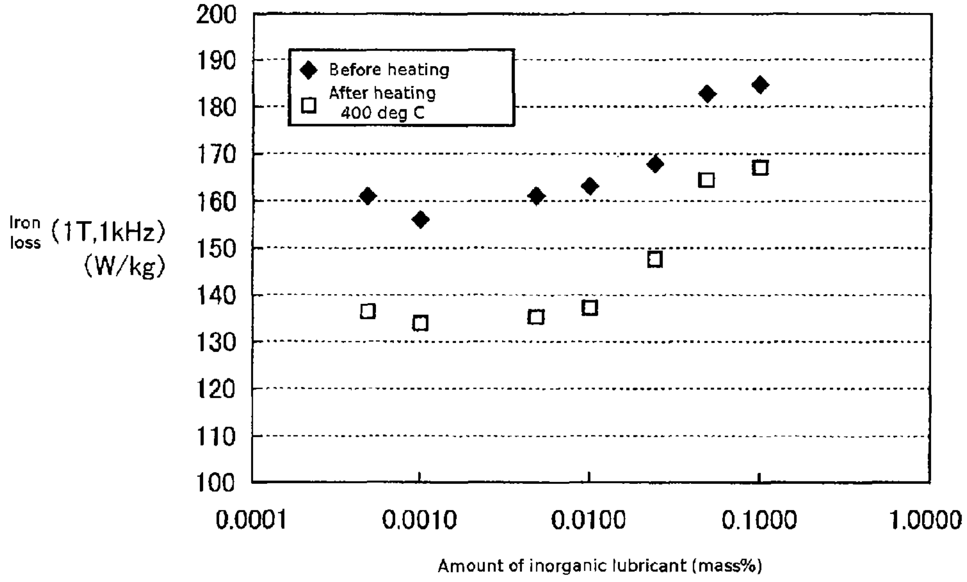
FIG. 14: Another graph showing the relationship between amounts of inorganic lubricant and iron loss of a compact in the fifth example of the present invention.

The values obtained from these measurements are shown in Table 3, and these values are plotted in FIG. 13 and FIG. 14.

In FIG. 14, the horizontal axis representing the inorganic lubricant 140 content is indicated as a logarithmic scale.

TABLE 3

| Amount of inorganic lubricant (mass %) | Density ($g/cm^3$) | Magnetic flux density B100 (T) | Iron loss (w/kg) Before heating | After heating |
|---|---|---|---|---|
| 0.0000 | 7.6 | 1.562 | 252.7 | 772.6 |
| 0.0005 | 7.63 | 1.568 | 160.8 | 136.2 |
| 0.0010 | 7.65 | 1.576 | 156.2 | 133.7 |
| 0.0050 | 7.61 | 1.559 | 161.2 | 135.2 |
| 0.0100 | 7.63 | 1.565 | 163.3 | 137.2 |
| 0.0250 | 7.61 | 1.563 | 167.7 | 147.2 |
| 0.0500 | 7.59 | 1.551 | 182.2 | 164.7 |
| 0.1000 | 7.55 | 1.512 | 184.1 | 167.4 |

As Table 3, FIG. 13, and FIG. 14 show, lower iron loss was obtained for the compact before heating when the proportion of the inorganic lubricant 140 was more than 0 and less than 0.05 percent by mass compared to when no inorganic lubricant 140 was added or when the proportion of the inorganic lubricant 140 was at least 0.05 percent by mass. This iron loss was reduced further by heating at a temperature of 400 deg C. Also, compared to other cases, when the proportion of the inorganic lubricant 140 is more than 0 and less than 0.05 percent by mass, it was possible to obtain both high density and high magnetic flux density.

Sixth Example

In this example, mixed powders are prepared by adding polyphenylene sulfide (PPS) as a thermoplastic resin to the mixed powder prepared in the fourth example with 0.001 percent by mass of the inorganic lubricant 140. Multiple types of mixed powder with different thermoplastic resin content were obtained by varying the amount of added thermoplastic resin from 0.001 percent by mass to 0.15 percent by mass. Also, for comparison, composite magnetic particles 130 were prepared with no thermoplastic resin at all and 0.001 percent by mass of inorganic lubricant 140.

Using these mixed powders, ring-shaped compacts were prepared as in the fifth example, and these compacts were heat under different temperature conditions. Heating temperatures were 200 deg C. and 400 deg C. As in the fifth example, the magnetic characteristics were measured for the compact before heating and the compacts heated at different temperatures. Also, the density of the compact heated at 400 deg C. was measured.

Figure 15:
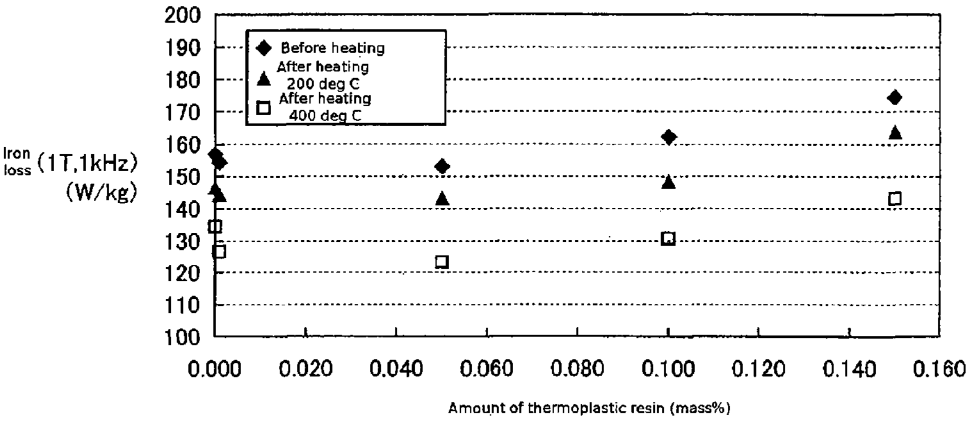
FIG. 15: A graph showing the relationship between amounts of thermoplastic resin and iron loss of a compact in a sixth example of the present invention.

The values obtained from these measurements are shown in Table 4, and these values are plotted in FIG. 15.

TABLE 4

| Amount of inorganic lubricant (mass %) | Thermoplastic resin (mass %) | Density ($g/cm^3$) | Magnetic flux density B100 (T) | Iron loss (w/kg) Before heating | After heating (200 deg C.) | After heating (400 deg C.) |
|---|---|---|---|---|---|---|
| 0.0010 | 0.000 | 7.65 | 1.576 | 156.2 | 145.8 | 133.7 |
| 0.0010 | 0.001 | 7.66 | 1.571 | 153.4 | 144.1 | 125.6 |
| 0.0010 | 0.050 | 7.56 | 1.532 | 152.7 | 143.4 | 122.9 |
| 0.0010 | 0.100 | 7.51 | 1.517 | 162.3 | 148.4 | 130.7 |
| 0.0010 | 0.150 | 7.44 | 1.471 | 174.7 | 164.2 | 143.2 |

As shown in Table 4 and FIG. 15, for the compacts heated at 400 deg C., the compacts with thermoplastic resin at proportions of at least 0.001 percent by mass and no more than 0.1 percent by mass were able to reduce iron loss more than those that did not contain thermoplastic resin. Iron loss increased when the proportion of thermoplastic resin exceeded 0.1 percent by mass. Based on this, it was possible to confirm that magnetic characteristics could be further improved by adding an appropriate proportion of thermoplastic resin.

Seventh Example

In this example, mixed powder prepared in the fourth example with 0.001 percent by mass of the inorganic lubricant 140 was compacted to form ring-shaped compacts as in the fifth example. Multiple types of compacts with different compacting conditions were made by varying the applied pressure. The compact was then heated for 1 hour at a temperature of 400 deg C. Magnetic characteristics were measured as in the fifth example for the compact before heating and after heating. Also, density was measured for the compact after heating, and the fill ratio of the compact was calculated according to the method described for the embodiments.

Figure 16:
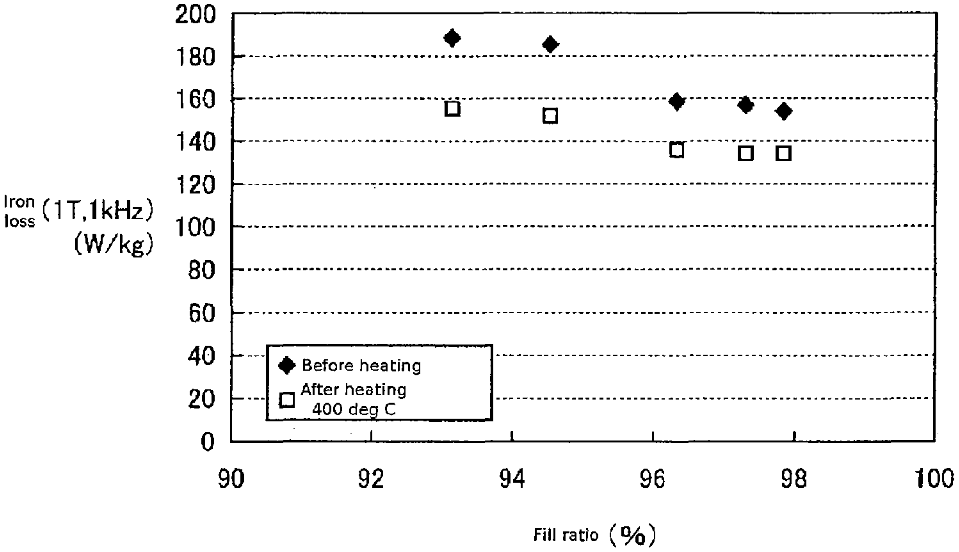
FIG. 16: A graph showing the relationship between fill rate of a compact and iron loss in a seventh example of the present invention.

The values obtained from these measurements are shown in Table 5, and these values are plotted in FIG. 16.

TABLE 5

| Applied pressure ($ton/cm^2$) | Density ($g/cm^3$) | Fill ratio (%) | Magnetic flux density B100 (T) | Iron loss (w/kg) Before heating | After heating |
|---|---|---|---|---|---|
| 8 | 7.32 | 93.1 | 1.389 | 189.1 | 155.5 |
| 9 | 7.43 | 94.5 | 1.483 | 184.2 | 151.2 |
| 10 | 7.57 | 96.3 | 1.529 | 158.4 | 136.1 |

TABLE 5-continued

| Applied pressure (ton/cm$^2$) | Density (g/cm$^3$) | Fill ratio (%) | Magnetic flux density B100 (T) | Iron loss (w/kg) Before heating | After heating |
|---|---|---|---|---|---|
| 11 | 7.65 | 97.3 | 1.576 | 156.2 | 133.7 |
| 12 | 7.69 | 97.8 | 1.603 | 154.1 | 134.4 |

As shown in Table 5 and FIG. 16, a fill ratio of at least 95 percent could be obtained by using a compacting pressure of at least 10 ton/cm$^2$. This made it possible to significantly reduce iron loss of the compact.

Eighth Example

In this example, mixed powders were prepared by adding the following to the iron powder from Hoganas Corp. used in the fourth example: a predetermined proportion of a nylon-based resin serving as a lubricant; a predetermined proportion of the hexagonal boron nitride used in the fourth example as a lubricant; and predetermined proportions of the hexagonal boron nitride used in the fourth example as a lubricant and polyphenylene sulfide (PPS) as a thermoplastic resin.

Using these mixed powders, ring-shaped compacts were made as in the fifth example, and these compacts were heated at different temperature conditions. Heating temperatures were 200 deg C., 300 deg C., and 400 deg C. As in the fifth example, the magnetic characteristics were measured for the compact before heating and the compacts heated at different temperatures. Also, the density of the compact heated at 400 deg C. was measured.

Figure 17:
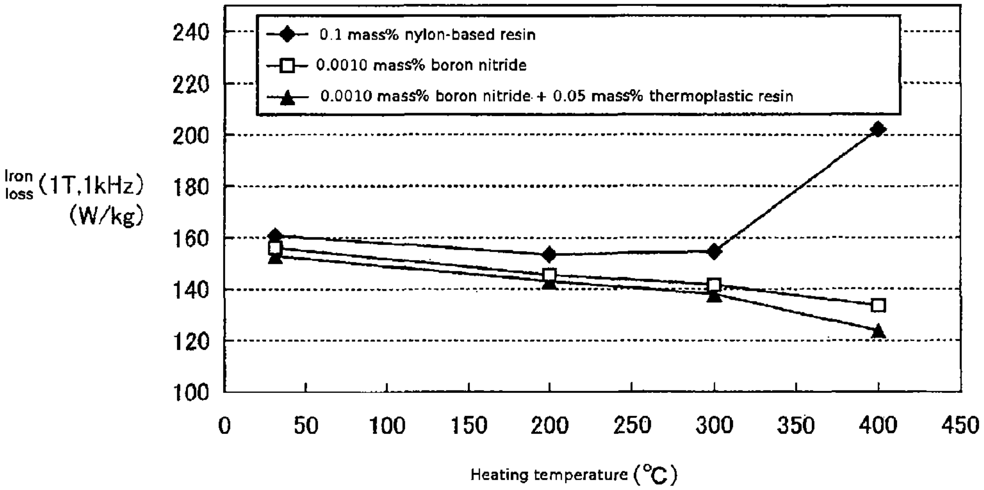
FIG. 17: A graph showing the relationship between heating temperature and iron loss of a compact in an eighth example of the present invention.

The values obtained from these measurements are shown in Table 6, and these values are plotted in FIG. 17.

TABE 6

| Lubricant | Thermoplastic resin | Density (g/cm$^3$) | Magnetic flux density B100 (T) | Iron loss (w/kg) Before heating | After heating 200 deg C. | After heating 300 deg C. | After heating 400 deg C. |
|---|---|---|---|---|---|---|---|
| Nylon-based resin (0.1 mass %) | 0 | 7.49 | 1.510 | 161.1 | 153.7 | 154.9 | 201.5 |
| Boron nitride (0.0010 mass %) | 0 | 7.65 | 1.576 | 156.2 | 145.8 | 141.7 | 133.7 |
| Boron nitride (0.0010 mass %) | Polyphenylene sulfide (PPS) (0.05 mass %) | 7.56 | 1.532 | 152.7 | 143.4 | 137.9 | 122.9 |

As shown in Table 6 and FIG. 17, iron loss is reduced by increasing the heating temperature when the mixed powder containing hexagonal boron nitride was used. When the mixed powder containing the nylon-based resin was used, iron loss increased when the heating temperature was increased to 400 deg C. It is believed that the nylon-based resin, which has low heat resistance, underwent thermal decomposition during heating.

The embodiments and examples described herein are provided solely as examples and should not be considered restrictive. The scope of the present invention is indicated not by the above description but by the claims, and all modifications within the scope and equivalences are covered by the present invention.

The present invention can, for example, be used in making motor cores, electromagnetic valves, reactors, and electromagnetic parts in general that are formed by compacting soft magnetic powder.

The invention claimed is:

1. A soft magnetic material used to make powder magnetic cores comprising:

a plurality of composite magnetic particles formed from a metal magnetic particle and an insulative coating surrounding a surface of said metal magnetic particle and containing metallic salt phosphate; and a lubricant formed as fine particles comprising zinc stearate, wherein:

said lubricant is added at a proportion of at least 0.001 percent by mass and no more than 0.01 percent by mass relative to said plurality of composite magnetic particles, and said lubricant has a mean particle diameter of no more than 2.0 microns.

2. A soft magnetic material used to make powder magnetic cores comprising:

a plurality of composite magnetic particles formed from a metal magnetic particle and an insulative coating surrounding a surface of said metal magnetic particle and containing an oxide selected from the group consisting of silicon oxide, titanium oxide, aluminum oxide and zirconium oxide or alloys thereof; and a lubricant formed as fine particles comprising zinc stearate, wherein:

said lubricant is added at a proportion of at least 0.001 percent by mass and no more than 0.01 percent by mass relative to said plurality of composite magnetic particles, and said lubricant has a mean particle diameter of no more than 2.0 microns.

3. A powder magnetic core comprising a soft magnetic material, wherein the soft magnetic material comprises:

a plurality of composite magnetic particles formed from a metal magnetic particle and an insulative coating surrounding a surface of said metal magnetic particle and containing metallic salt phosphate; and a lubricant formed as fine particles comprising zinc stearate added at a proportion of at least 0.001 percent by mass and no more than 0.01 percent by mass relative to said plurality of composite magnetic particles, and said lubricant formed as fine particles has a mean particle diameter of no more than 2.0 microns, wherein the powder magnetic core exhibits an iron loss of at least 145 W/kg and no more than 194 W/kg.

4. A powder magnetic core comprising a soft magnetic material, wherein the soft magnetic material comprises:

a plurality of composite magnetic particles formed from a metal magnetic particle and an insulative coating surrounding a surface of said metal magnetic particle and containing an oxide selected from the group consisting of silicon oxide, titanium oxide, aluminum oxide and zirconium oxide or alloys thereof; and a lubricant formed as fine particles comprising zinc stearate added at a proportion of at least 0.001 percent by mass and no more than 0.01 percent by mass relative to said plurality of composite magnetic particles, wherein:

said lubricant formed as fine particles has a mean particle diameter of no more than 2.0 microns, wherein the powder magnetic core exhibits an iron loss of at least 145 W/kg and no more than 194 W/kg.

* * * * *